(12) United States Patent
Fiedler et al.

(10) Patent No.: US 6,883,708 B1
(45) Date of Patent: Apr. 26, 2005

(54) TRANSACTION MAPS EMBEDDED WITHIN OR PROVIDED WITH CHARGE-CARD BILLING STATEMENTS

(76) Inventors: Reno Fiedler, 11303 E. Prince Rd., Tucson, AZ (US) 85749; Xiaohui Zhang, 7459 E. Calle Perpetuo, Tucson, AZ (US) 85715

( * ) Notice: Subject to any disclaimer, the term of this patent is extended or adjusted under 35 U.S.C. 154(b) by 0 days.

(21) Appl. No.: 10/848,862

(22) Filed: May 20, 2004

(51) Int. Cl.[7] .............................................. G06K 5/00
(52) U.S. Cl. ...................................... 235/380; 235/385
(58) Field of Search ............................... 235/380, 385; 705/28, 34, 40

(56) References Cited

U.S. PATENT DOCUMENTS

| | | | | |
|---|---|---|---|---|
| 5,684,965 A | * | 11/1997 | Pickering | 705/34 |
| 5,963,922 A | * | 10/1999 | Helmering | 705/35 |
| 6,035,285 A | * | 3/2000 | Schlect et al. | 705/30 |
| 6,070,798 A | * | 6/2000 | Nethery | 235/462.01 |

* cited by examiner

Primary Examiner—Daniel St. Cyr

(57) ABSTRACT

A method and system is described herein to summarize and present charge-card transactions through one or more maps linked to charge-card billing statements. In addition to a conventional tabular transaction list, the invented system provides charge-card transaction maps, which display the physical location of points-of-charges geo-referenced to a map. Transactions are listed individually and/or are summarized by the number of transactions, the timing of transactions, the amount of transactions, the transactions categories, local-area and none-local-area transactions, sensitive transactions, geographic unit, or any combination thereof. The method and system integrates database and geographic information system technology with a rule system.

11 Claims, 4 Drawing Sheets

One example of a transaction map with home address and local points-of-charges

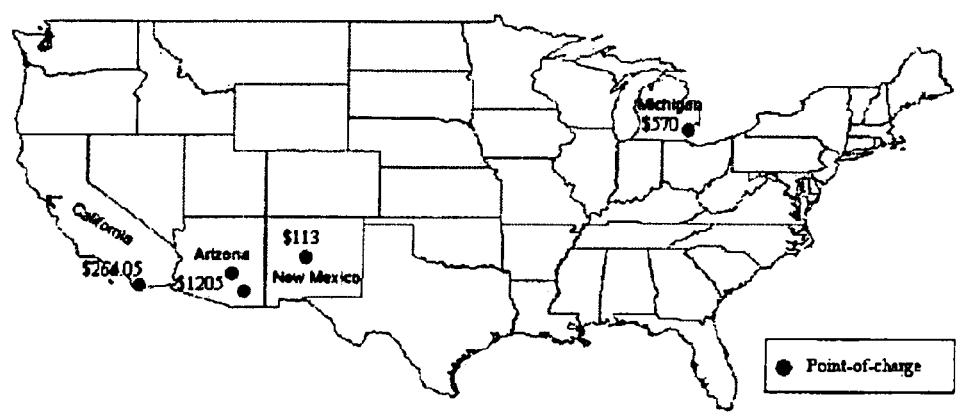
Figure 1. One example of a summary map displaying points-of-charges

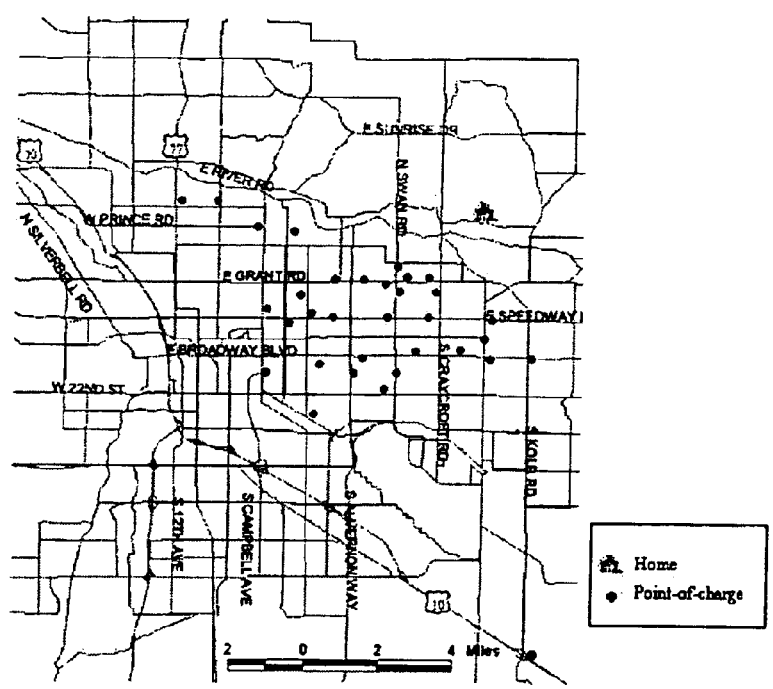
Figure 2. One example of a transaction map with home address and local points-of-charges

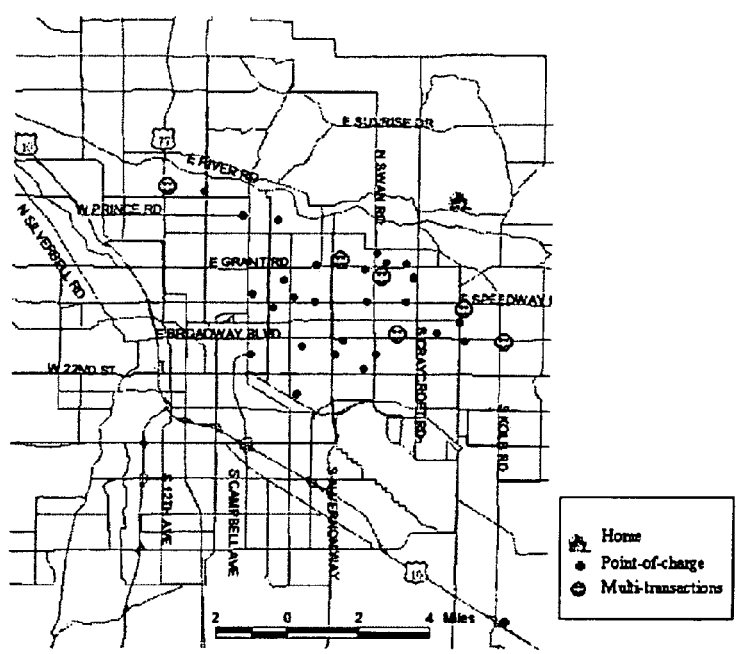
Figure 3. One example of a transaction map displaying points-of-charges with multiple transactions

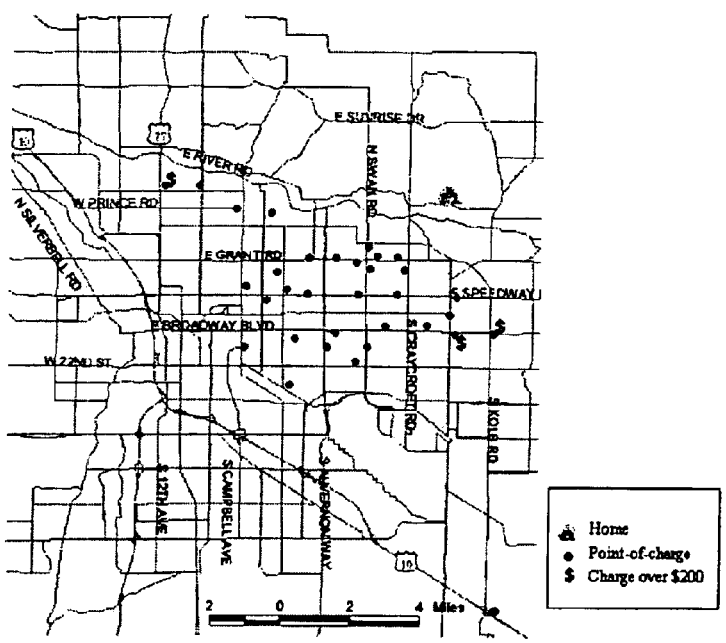
Figure 4. One example of a transaction map displaying points-of-charges with charge amounts over $200.

TRANSACTION MAPS EMBEDDED WITHIN OR PROVIDED WITH CHARGE-CARD BILLING STATEMENTS

BACKGROUND OF THE INVENTION

The present invention relates to the field of charge-card billing statements. Examples of charge-cards include credit cards, debit cards, bank cards, ATM cards, store cards, gas cards, etc. More particularly, this invention relates to the visual presentation of the conducted transactions over a certain period of time by maps to summarize the card transactions in locations, amount, category and time, in addition to the conventional transaction list in a billing statement. The more intuitive presentation of transactions in maps allows the cardholder to identify sensitive or alerting charges more readily. An example of the sensitive charge can be a transaction at the point-of-charge out of the local area or a transaction with a significant charge amount.

Billing statements for charge-cards report the transactions the cardholder conducted with a list of transaction date, merchant name (store name), category of merchant, point-of-charge (merchant address), and charged amount. With the increasing use of charge-cards, and a large number of people possessing multiple charge-cards (such as credit cards, bank cards, department store cards, . . . ), the tabular billing statements often make it difficult for cardholders to check the detailed transactions, which is especially true for multi-page billing statements.

Geographical Information Systems (GIS) in general, and Geo-coding tools in particular, are information systems which can be used to geo-reference cardholder, transactions, or merchant address information by comparing the available address information to a street network. Through such process, geographic coordinates (x, y) can be added to the address information. The process of adding geographic coordinates (x, y) is called geo-coding. With geo-coded address data, the spatially aware charge-card transaction system can manage the transaction information in both relational and spatial dimensions. This spatially aware transaction system can now be used for analyzing, organizing, and displaying the spatial information in addition to its traditional uses.

The method and system presented herein integrates geo-referencing technology with a charge-card billing system. The geo-coded cardholder, transaction, and merchant addresses are stored, managed and analyzed. The transactions are categorized into local-area transactions, none-local-area transactions, sensitive transactions and ordinary ones. The sensitive transactions are the ones with significant amount of charges, or the point-of-charge is not in the assumed local-area. The GIS produces a set of transaction maps, which could display the point-of-charges and summarized transactions, thus, improving the quality of service for cardholders as they review their charge-card billing statement. This visual representation of transactions will aid cardholders to identify fraudulent charges more easily. Ultimately, it will benefit the card issuer in consumer purchasing studies and customer relationship management.

A GIS tool usually provides maps with very rich colors and symbols in displaying the locations of assets or activities. However, now most of the charge-card billing statements are printed in black and white. In order to show all kinds of transactions in a transaction map only with black and white, the special considerations are needed in the map presentations.

We have not seen any publication or patent relating charge-card transaction maps to billing statements.

BRIEF SUMMARY OF THE INVENTION

A method and system is described herein to summarize and present charge-card transactions through one or more maps linked to charge-card billing statements. The invention consists of a rule system, the database, and a GIS tool. The invention can be used to communicate spending patterns to charge card holders by charge card providers. It can furthermore be used for fraud detection through the use of visualization means other than tables which are often lengthy and hard to comprehend by the charge card holder. Additionally, the presentation of the charge information through alternative means, e.g. maps, has great appeal to customers thus improving the marketing potential of the charge card provider to current and future customers.

BRIEF DESCRIPTION OF THE DRAWINGS

The features and characteristics of transaction maps are described in detail in this document. The following figures have been included to aid the understanding of the invention itself and its advantages. These examples are not exhaustive but illustrative of the potential of this invention.

FIG. 1 is one example of a summary transaction map. It identifies the charges of this billing period to be from cities in four states, California, Arizona, New Mexico and Michigan. It also labels the total charges in each state.

FIG. 2 is one example of a local-area transaction map. It displays the cardholder's home address and all the points-of-charges.

FIG. 3 is one example of a local-area transaction map. It differs from FIG. 2 in that this map highlights the points-of-charges with multiple transactions.

FIG. 4 is one example of a 'sensitive transaction map', since it marks the places where the charges are over $200.

DETAILED DESCRIPTION

A method and system is described herein to summarize and present charge-card transactions through one or more maps linked to charge-card billing statements. The invention consists of a rule system, the database, and a GIS tool.

The database stores the records with card and cardholder information (such as card ID, cardholder names, home address, phone number, etc.), and the records with transaction data (such as the card ID, transaction number, transaction time, charge amount, merchant category, approval number, merchant ID and name, the point-of-charge, etc.), and the records with merchant information (such as the merchant ID, name, business address, phone number, etc.). There are three basic location data: cardholder home address, points-of-charges or transaction address, and the merchant address.

A GIS stores the reference street data to geo-code addresses within the United States and other countries. A geo-coding tool performs the geo-referencing as necessary. Transactions will be geo coded on system entry or in a data store, while merchant and cardholder address information needs only periodic geo-coding based on reported changes. The GIS tool also produces the transaction maps according to the outputs of the rule system.

The rule system can analyze the transactions by points-of-charges and the amount of charges, it can also identify the transaction areas, category of the transactions, and summarize transactions by location, by time, by amount, by category, or any combination thereof. It can also summarize transactions by geographic units.

The rule system consists of a set of rules, functions and processes to analyze the card information, transaction data, and the merchant information.

The rule system interacts with the database and GIS tool. The transaction data may be read-only, while the location data can be updated through geo-coding. In the displays of transaction maps, the summary of transactions can be aggregated into geographic units. For example, the rule system analyzes the geo-coding condition for each point-of-charge, if necessary the rule system will send a message to the geo-coding tool and let the tool perform the geo-coding. Another example is that the rule system will send a message to the GIS tool for producing a specific summary transaction map in a selected area.

A rule system can have a set of rules to identify the point-of-charge area, such as the postal zip code, the telephone area code, and then group them. An example is to use the first 3 digits of the zip codes in identifying and grouping areas. Another example is to have a map displaying the cardholder's home address and all the point-of-charges of the transactions in local area, and the number of the transactions. The GIS tool could easily provide the summary driving distance from his home to the point-of-charges.

A rule system can have a set of rules and processes to identify the number of transactions at a point-of-charge, and summarize the total amount of charges at that point-of-charge;

A rule system can have a set of rules and processes to sort and rank the amount of charges, and then identify the top-N transactions and their point-of-charge areas;

A rule system can have a set of rules and processes to categorize the transactions, and summarize the total amounts charged in each category by the points-of-charges. An example is the summary of transactions in pharmacy stores.

A rule system can have a set of rules and processes to categorize and summarize the transactions on weekdays or on weekends, and the ir respective points-of-charges. An example is the summary of transactions in restaurants at weekends by points-of-charges.

A rule system can have a set of rules and processes to categorize and summarize the transactions by day, by week or by the day of week. An example is the summary of transactions in the first week by points-of-charges.

A rule system can also handle the combination of above summaries. An example is to summarize the transactions in weekend with the amount above $200 on a map of points-of-charges.

In summary, the advantages of the presented invention should be apparent in view of the detailed description provided above. The transaction maps should provide cardholders with a more intuitive understanding of their spending patterns. These maps also enable the cardholder to check the location of the transactions and, therefore, more easily detect fraudulent use of their cards. Examples of additional benefits to the cardholder include: how their shopping is spatially distributed, where the top-n transactions occurred, where are the most frequently used merchants, where the weekend charges occurred, and on what category and where they spent significant amounts in that billing period. The benefits to charge card providers include but are not limited to better marketing appeal and enhanced service to the clients.

Disclaimer

While the invention disclosed has been described by means of specific applications thereof, numerous modifications and variations could be made thereto by those skilled in the art without departing from the scope of the invention set forth in the claims.

References

Demers, Michael N., "Fundamental of Geographical Information Systems", John Wiley, 2000;

Grimshaw, David J., "Bring Geographical Information Systems Into Business", John Wiley, 2000;

Martin, David, "Geographical Information Systems: Socio-economic Applications", Routledge, 1996.

What is claimed is:

1. A method and system for geographically presenting and summarizing charge-card transactions and visually alerting a cardholder to sensitive transactions by transaction map(s) in charge-card billing statements, comprising:

integration of a database technology, a geographic information system, and a rule system;

summarizing all or a subset of all transactions by a map which displays geo-referenced points-of-charges;

summarizing the transaction amounts by points-of-charges within the map;

summarizing the number of transactions by points-of-charges within the map;

summarizing categorized transactions by points-of-charges within the map;

summarizing the transactions with significant amounts charged by points-of-charges within the map;

summarizing local-area transactions within the map;

summarizing none-local-area transactions within the map;

summarizing weekday transactions by points-of-charges within the map;

summarizing weekend transactions by points-of-charges within the map;

summarizing weekly transactions by points-of-charges within the map;

the map is not summarized by point-of-charges but summarized by geographic unit.

2. The apparatus as claimed in claim 1, where said summary of transactions by points-of-charges within the map includes displaying symbols or text denoting the points-of-charges based on geo-referenced information about the transaction's or a merchant's street address, zip code, city, and state for each or some transactions at a place.

3. The apparatus as claimed in claim 1, where said summary of transaction amounts by points-of-charges within the map includes displaying symbols or text at the geo-referenced points-of-charges, where the size, the shape, or the color of the symbols or the text reflect a total or a certain range of transaction amount at a place.

4. The apparatus as claimed in claim 1, where said summary of the number of transactions by points-of-charges within the map includes displaying symbols or text at the points-of-charges, where the size, the shape, or the colors of the symbol or the text reflects an actual number or a certain range of numbers of transactions at a place.

5. The apparatus as claimed in claim 1, where said summary of categorized transactions includes department stores, grocery stores, pharmacies, hotels, travel agencies, restaurants, and gas stations.

6. The apparatus as claimed in claim 1, where said summary of sensitive transactions includes transactions with significant amount of charges in a billing period.

7. The apparatus as claimed in claim 1, where said summary of local and/or non-local transactions includes all places within or outside, respectively, of a cardholder's home area, as may be defined by address plus distance function, or any geographic unit, including zip code, phone number area, city or town, county, state, country, or continent.

8. The apparatus as claimed in claim 1, where said summary of weekday transactions by points-of-charges within the map includes displaying symbols or text denoting the geo-referenced points-of-charges for transactions conducted on weekdays.

9. The apparatus as claimed in claim 1, where said summary of weekend transactions by points-of-charges within the map includes displaying symbols or text denoting the geo-referenced points-of-charges for transactions conducted on weekends.

10. The apparatus as claimed in claim 1, where said summary of weekly transactions contains displays of symbols or text where the size, the shape, or the color of the symbols or text identifies transactions that were conducted during a first week, second week, third week and fourth week of a billing period.

11. The apparatus as claimed in claim 1, where said summary of transactions by geographic unit contains displays of geographic units where the size, the shape, the color, the pattern, labeling text, or any combination thereof identifies a transaction pattern or combination thereof.

\* \* \* \* \*